(12) United States Patent
Hokari et al.

(10) Patent No.: US 12,189,162 B2
(45) Date of Patent: Jan. 7, 2025

(54) WIRE-GRID POLARIZER AND PROCESS FOR PRODUCING THE SAME

(71) Applicants: National Institute of Advanced Industrial Science and Technology, Tokyo (JP); Mitsubishi Gas Chemical Trading, Inc., Tokyo (JP)

(72) Inventors: Ryohei Hokari, Ibaraki (JP); Kazuma Kurihara, Ibaraki (JP); Kyohei Takakuwa, Tokyo (JP); Akitaka Yamamoto, Aichi (JP); Yusuke Yamaguchi, Aichi (JP)

(73) Assignees: National Institute of Advanced Industrial Science and Technology, Tokyo (JP); Mitsubishi Gas Chemical Trading, Inc., Tokyo (JP)

( * ) Notice: Subject to any disclaimer, the term of this patent is extended or adjusted under 35 U.S.C. 154(b) by 499 days.

(21) Appl. No.: 17/535,744

(22) Filed: Nov. 26, 2021

(65) Prior Publication Data
US 2022/0082750 A1    Mar. 17, 2022

Related U.S. Application Data

(63) Continuation of application No. PCT/JP2020/019185, filed on May 14, 2020.

(30) Foreign Application Priority Data

Jun. 25, 2019  (JP) .................................. 2019-117465

(51) Int. Cl.
   *G02B 5/30*    (2006.01)
(52) U.S. Cl.
   CPC ......... *G02B 5/3058* (2013.01); *G02B 5/3041* (2013.01)

(58) Field of Classification Search
   CPC .................................................. G02B 5/3058
   See application file for complete search history.

(56) References Cited

U.S. PATENT DOCUMENTS

| 7,961,393 | B2 | 6/2011 | Perkins et al. |
| 2010/0007827 | A1 | 1/2010 | Nishimura et al. |

(Continued)

FOREIGN PATENT DOCUMENTS

| JP | 2004-309903 A | 11/2004 |
| JP | 2006-308668 A | 11/2006 |

(Continued)

OTHER PUBLICATIONS

JP2009244312, translation (Year: 2009).*

(Continued)

*Primary Examiner* — Wen Huang
(74) *Attorney, Agent, or Firm* — Kubotera & Associates, LLC

(57) ABSTRACT

A wire-grid polarizer includes metal reflectors which are embedded in a large number of grooves formed in a one-dimensional grid pattern in the same direction and with the same period in the front surface of a transparent sheet, wherein the average width (a) of the metal reflectors is 200 nm or less, the ratio (b/a) of the average thickness (b) of the metal reflectors from the front side of the sheet to the tip in the backward direction to the above average width (a) is 4 to 25, in any cross-section perpendicular to the surface of the sheet, the shape of each of the metal reflectors in the vicinity of the tip in the thickness direction is such that it gradually becomes thinner in a linear or smoothly curved shape toward the tip, and the ratio of the average length (c) toward the tip of portions that gradually become thinner toward the tip to the above average width (a) is 1.2 or more.

9 Claims, 8 Drawing Sheets

(56) References Cited

U.S. PATENT DOCUMENTS

2011/0096396 A1    4/2011   Kaida et al.
2011/0205457 A1    8/2011   Sawaki

FOREIGN PATENT DOCUMENTS

| JP | 2009-204894 A | 9/2009 |
|---|---|---|
| JP | 2009-244312 A | 10/2009 |
| JP | 2010-204297 A | 9/2010 |
| JP | 2011170136 A | 9/2011 |
| JP | 2012-73484 A | 4/2012 |
| JP | 2012-073484 A | 4/2012 |
| JP | 2012-98703 A | 5/2012 |
| JP | 5096735 B2 | 9/2012 |
| JP | 5277455 B2 | 5/2013 |
| JP | 5291424 B2 | 9/2013 |
| JP | 5291425 B2 | 9/2013 |
| JP | 5368011 B2 | 12/2013 |
| JP | 5459210 B2 | 1/2014 |
| JP | 2018-159880 A | 10/2018 |

OTHER PUBLICATIONS

Notification of Reasons of Refusal for JP Patent Application No. JP2019-117465 issued by JPO dated on Jul. 18, 2023.
Notification of Reasons of Refusal for CH Patent Application No. JP2019-117465 issued by CNIPA dated on Sep. 22, 2023.
Low-reflective wire-grid polarizers with an absorptive layer formed by glancing angle deposition, Image Information, vol. 65, No. 10, pp. 1440-1445 (2011).
International Search Report for PCT Application No. PCT/JP2020/019185 issued by Japan Patent Office as ISA on Aug. 4, 2020.

* cited by examiner

WIRE-GRID POLARIZER AND PROCESS FOR PRODUCING THE SAME

CROSS-REFERENCE TO RELATED APPLICATIONS

This is a continuation application of a prior PCT application No. PCT/JP2020/019185 filed on May 14, 2020.

TECHNICAL FIELD AND BACKGROUND ART

The present invention relates to a wire-grid polarizer which is excellent in polarization performance, can maintain required light transmittance, has low reflectance on the back side and can be expected to be applied not only to optical products such as various displays, cameras, and optical measuring instruments, but also to polarized sunglasses and smart windows.

Birefringent crystal, dichroic dye and wire-grid polarizers are known as the main polarizers in the optical field. Although the birefringent crystal polarizers are used for optical communications as devices having different output directions due to light incident on the optical axis of a birefringent crystal at an angle, their applications are limited because the crystal is used as a polarizer. The dichroic dye polarizers are widely used as absorption type polarizers which are produced by adsorbing a dichroic dye to an uniaxially stretched polyvinyl alcohol film and orienting it.

Iodine or dichroic organic dyes are commonly used as dichroic dyes. Although iodine-based polarizers have excellent polarizing performance, they are relatively inferior in terms of durability due to their weakness against heating and humidification.

On the other hand, dye-based polarizing films are used in fields where durability performance is required since they are dye-based polarizing films are superior in durability to iodine-based polarizing films, though their polarizing performance is inferior.

The wire-grid polarizers are reflective polarizers in which wire-shaped objects made of metal or other materials are arranged in a striped pattern with a specific period.

If the period of the stripes is sufficiently small compared to the wavelength of the incident electromagnetic wave (light) (for example, the visible light range is from 400 nm to 800 nm), the light of an electric field component parallel to the above wire-shaped objects is reflected, and the light of the electric field component perpendicular to the wire-shaped objects is transmitted. Therefore, the wire-grid polarizers have been used for many applications because they can be made thinner than the dichroic dye and birefringent crystal polarizers and widely used as polarizers for projection optical systems as they can obtain a high extinction ratio due to the higher transmittance of the transmission axis than the dichroic dye polarizers and further can obtain high heat resistance and durability.

In the wire-grid polarizer in the visible light range, the pitch of the metal wires must be sufficiently smaller than 400 nm. It is known that fine metal stripe patterns can be formed on metal films deposited by vapor deposition or sputtering on transparent substrates by using microfabrication such as electron beam lithography and focused ion beam etching. As a simpler method, there is proposed a method in which the stripe structure of thin metal wires is formed by depositing or sputtering a metal film on a concavo-convex structure formed on the surface of a substrate by imprinting or other method (see Patent Document 1, Patent Document 2, etc.).

The wire-grid polarizer has higher reflectance than dichroic dye and birefringent crystal polarizers. Therefore, for applications where high reflectance is not desirable, there are proposed methods of reducing the reflectance of the wire-grid polarizer (see Non-Patent Document 1, Patent Document 3, Patent Document 4, Patent Document 5, Patent Document 6, Patent Document 7, etc.). For example, Non-patent Document 1 proposes a method in which a dielectric layer and a $FeSi_2$ light absorbing layer are deposited on an aluminum wire-grid pattern on a substrate and teaches that reflectance can be reduced by controlling the thickness of the absorbing layer.

Patent Document 5 discloses a light-absorbing wire-grid polarizer that is deposited with a metal with relatively low reflectance, such as a nickel-chromium alloy, and also discloses a polarizer produced by stacking this absorbing polarizer and a conventional reflective wire-grid polarizer. These polarizers are made using metal vacuum deposition technology by vapor deposition or sputtering.

Patent Document 8 discloses a method using ink containing metal fine particles as a method for manufacturing a wire-grid polarizer without using such a vacuum deposition method. In this case, a wire-grid pattern made of a conductive nanomaterial or aggregate thereof is obtained by filling the concave parts of a grid having a specific pitch formed in the surface of a curable resin on a support film with metal ink.

REFERENCE DOCUMENTS

Patent Document 1: Japanese Patent Publication No. 5459210
Patent Document 2: Japanese Patent Publication No. 2009-204894 A
Patent Document 3: Japanese Patent Publication No. 5291424
Patent Document 4: Japanese Patent Publication No. 5291425
Patent Document 5: Japanese Patent Publication No. 5368011
Patent Document 6: Japanese Patent Publication No. 5277455
Patent Document 7: Japanese Patent Publication No. 2012-98703 A
Patent Document 8: Japanese Patent Publication No. 5096735

Non-Patent Document 1

"Low-reflective wire-grid polarizers with an absorptive layer formed by glancing angle deposition" The journal of the Institute of Image Information and Television Engineers Vol. 65, No. 10, pp. 1440-1445 (2011)

SUMMARY OF THE INVENTION

However, in the wire-grid polarizer made of a conductive nanomaterial or aggregate thereof formed by the method disclosed in the above patent document, since the polarization degree at a certain wavelength is 90% or less at maximum in the visible light range from 400 nm to 800 nm. Especially in the wavelength range of 450 nm to 570 nm, the polarization degree is only above 60% and therefore, there is room for improvement as a polarizer in the visible light range. The above patent document does not disclose much about light transmittance and reflectance.

For the manufacture of a low-reflective wire-grid polarizer using vacuum deposition technology, for example, glancing angle deposition technology is used for the polarizer described in non-patent document 1. However, with this technology, it is not easy to manufacture polarizers with large areas because of the need for high-precision film thickness control, and it is also not easy to stably manufacture a low-reflection wire-grid polarizer because of the complexity of the manufacturing process.

Although the low-reflective metal wire-grid polarizer described in Patent Document 4 can reduce the reflectance compared to the high-reflective metal wire-grid polarizer, the reflectance is 10% or more which is higher than that of dichroic dye polarizers, and the polarization degree does not reach 90%.

In addition, in the polarizing element described in Patent Document 5, which is a combination of a wire-grid polarizing element using a metal with relatively low reflectance and a wire-grid polarizing element using a metal with high reflectance, the polarization degree is comparable to that of a conventional wire-grid polarizing element using a metal with high reflectance, and the reflectance can be reduced to about 17%, but the reflectance of the incident light from the back side is as high as 40% or more.

As described above, it is still difficult to achieve the excellent features of a wire-grid polarizer, namely, excellent polarization performance, the capability of maintaining required light transmittance and low back-side reflectance. In recent years, thin polarizers which have excellent polarization performance, can maintain required light transmittance and have low back-side reflectance have been required for liquid crystal displays of smartphones and notebook-size personal computers, projectors, optical instruments for measurement, polarized sunglasses, and so on. The realization of such thin polarizers will have a significant ripple effect.

It is an object of the present invention which was made in view of the above points to provide a wire-grid polarizer which has high polarization degree, maintain required light transmittance and can suppress reflectance on the back side in particular among the front side and the back side.

In view of the above prior art, the inventors of the present invention have found a wire-grid polarizer in which metal reflectors are embedded in grooves provided in one-dimensional grid pattern in the front surface of a transparent sheet.

Specifically, they have found that, by controlling the thickness of each of the metal reflectors in the backward direction from the front side of the sheet and the ratio (thickness/width) of the thickness to the width of each of the metal reflectors and setting the shape in the vicinity of the tip in the thickness direction to a specific shape that it gradually becomes thinner toward the tip, a wire-grid polarizer which has excellent polarization performance, maintains required light transmittance and can reduce reflectance on the back side in particular can be obtained. The present invention has been accomplished based on this finding.

That is, the gist of the present invention is inventions described in (1) to (10).

(1) A wire-grid polarizer in which metal reflectors (B) are embedded in a large number of grooves (C) provided in the front surface of a transparent sheet (A) in a one-dimensional grid pattern in the same direction and with the same period, wherein the average width (a) of the metal reflectors (B) is 200 nm or less, the ratio (b/a) of the average thickness (b) of the metal reflectors (B) from the front side of the sheet (A) to a tip in the backward direction to the average width (a) is from 4 to 25, and, in any cross-section perpendicular to the front surface of the sheet (A), the shape of the metal reflector (B) in the vicinity of the tip in the thickness direction is such that it gradually becomes thinner in a linear or smoothly curved shape toward the tip, and the ratio (c/a) of the average length (c) toward the tip of portions (D) that gradually become thinner toward the tip to the above average width (a) is 1.2 or more.

(2) The wire-grid polarizer in the above paragraph (1), wherein the ratio (c/a) of the average length (c) toward the tip of the portions (D) that gradually become thinner toward the tip in the vicinity of the tip in the thickness direction of the metal reflectors (B) to the average width (a) is from 1.2 to 8.

(3) The wire-grid polarizer in the above paragraph (1) or (2), wherein the ratio (d/a) of the period of the one-dimensional grid array of the metal reflectors (B) to the average width (a) is from 1.3 to 20.

(4) The wire-grid polarizer in the above paragraph (1) or (2), wherein the shape of the portion (D) that gradually becomes thinner toward the tip in the vicinity of the tip in the thickness direction of the metal reflector (B) is an almost inverted triangular shape having an apex located in the tip direction in the cross-section perpendicular to the one-dimensional grid array direction (wire-grid polarizer (R1)), a continuous, almost triangular wave shape having apexes located in the tip direction in the cross-section perpendicular to the front surface of the sheet (A) and in the one-dimensional grid array direction (wire-grid polarizer (R2)), or a shape that almost quadrangular pyramid structures having an apex located in the tip direction or structures gradually changing into an almost conical shape toward the apex from the base of the almost quadrangular pyramid structure are continuous in the one-dimensional grid array direction (wire-grid polarizer (R3)).

(5) The wire-grid polarizer in the above paragraph (4), wherein the shape of the portion (D) that gradually becomes thinner toward the tip in the vicinity of the tip in the thickness direction of the metal reflector (B) is such that, in the case of the wire-grid polarizer (R1), the height toward the tip of the almost inverted triangular shape in the cross-section perpendicular to the front surface of the sheet (A) and in the one-dimensional grid array direction changes further continuously and regularly or irregularly, in the case of the wire-grid polarizer (R2), the length of the base and the height toward the tip having an almost triangular wave shape in the cross section perpendicular to the front surface of the sheet (A) and in the one-dimensional grid array direction change further continuously and regularly or irregularly, or, in the case of the wire-grid polarizer (R3), the length in the one-dimensional grid array direction and the height toward the tip of the almost quadrangular pyramid structure or the structure gradually changing into an almost conical shape toward the apex from the base of the almost quadrangular pyramid structure change further continuously and regularly or irregularly, and the ratio (c/b) of the average length toward the tip of the portions (D) that gradually become thinner toward the tip to the average thickness (b) of the metal reflectors (B) is 0.3 or less in all the wire-grid polarizers (R1) to (R3).

(6) The wire-grid polarizer in the above paragraph (1) or (2), wherein each of the metal reflectors (B) embedded in the grooves (C) of the sheet (A) is embedded in the groove (C) as a single continuous structure or in such a manner that a plurality of block-like structures are stacked in the groove (C) at a high density independently or partially or fully bonded together on the outer surfaces thereof.

(7) The wire-grid polarizer in the above paragraph (1) or (2), wherein the metal reflector (B) is a sintered body of metal fine particles.

(8) The wire-grid polarizer in the above paragraph (1) or (2), wherein the sheet (A) is a sheet made from a material selected from polycarbonate resin, polyacrylic resin, polyamide resin, polyester resin, polyolefin resin, polycycloolefin resin, polyurethane resin, cellulose resin, polyvinyl chloride resin, polyether resin, polyacrylate resin and polysulfone resin.

(9) The wire-grid polarizer in the above paragraph (1) or (2), wherein the metal reflector (B) is made from one or a mixture of two or more selected from aluminum, nickel, chromium, platinum, palladium, titanium, gold, silver, copper and alloys thereof.

(10) A process for manufacturing a wire-grid polarizers in which a large number of grooves (C) are formed in the front surface of a transparent sheet (A) in a one-dimensional grid pattern in the same direction and with the same period by the nanoimprinting method and then metal reflectors (B) are embedded in the grooves (C), wherein the structure of each convex part forming the groove (C) in a mold used to form the grooves (C) in the sheet (A) by the nanoimprinting method is characterized in that the average width (a') is 200 nm or less, the ratio (b'/a') of the average length (b') toward the tip to the average width (a') is from 4 to 25, the shape of each convex part in the vicinity of the tip is such that it gradually becomes thinner in a linear or smoothly curved shape toward the tip, and the ratio (c'/a') of the average length (c') toward the tip of portions (D') that gradually become thinner toward the tip to the average width (a') is 1.2 or more.

The wire-grid polarizer of the present invention has excellent polarization performance, can maintain required light transmittance and can significantly reduce the reflectance of incident light from the back side. Since each metal reflector (B) is embedded in each groove (C) of the sheet (A), the wire-grid polarizer of the present invention is scratch-resistant and has such high surface durability that the polarization function thereof is hardly affected even when it is rubbed or wiped.

In addition, since each metal reflector (B) is covered by each groove structure of the sheet (A), the number of exposed parts from the front surface can be reduced with the result that the oxidation of each metal reflector (B) hardly progresses, thereby making it possible to provide a wire-grid polarizer which has heat and humidity resistance and can maintain its performance for a long time even in outdoor or high-temperature and high-humidity environments.

Since the wire-grid polarizer of the present invention can be adapted to molding processes such as film insert molding and cast molding, molded products with low reflection and polarization function can also be realized. By selecting a thermoplastic resin to be used for the sheet (A), it is easy to obtain the wire-grid polarizer that is resistant to stretching, rigid, and bendable. Furthermore, the wire-grid polarizer of the present invention can be manufactured by printing and sintering techniques using ink containing metal fine particles or plating means and can be produced at relatively low cost because it does not require complicated and expensive equipment.

DETAILED DESCRIPTION OF PREFERRED EMBODIMENTS (I) The Wire-Grid Polarizer

The following is a description of the elements and structure of the wire-grid polarizer of the present invention. Although the shape of each metal reflector (B) is not so-called "wire-shaped" in the wire-grid polarizer of the present invention, since the term "wire-grid polarizer" is used in the technical field even when the metal reflectors are not wire-shaped, the term "wire-grid polarizer" is used.

Figure 1:
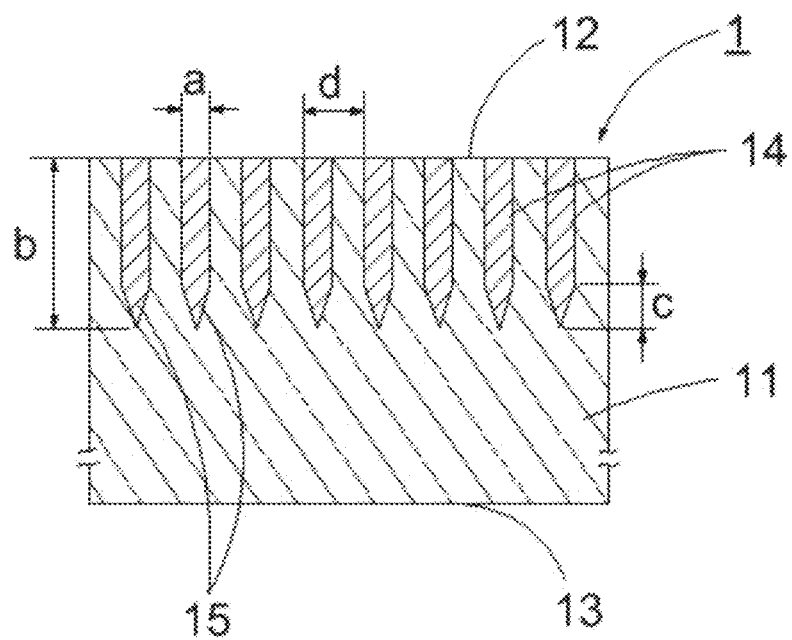
FIG. 1 is a conceptual diagram showing an illustrative cross-section of one example of the wire-grid polarizer of the present invention.

FIG. 1 is a cross-sectional view schematically illustrating the wire-grid polarizer (R1) 1 of the present invention. The sheet (A) 11 has a front side 12 and metal reflectors (B) 14 are embedded in the front side 12. Each of the metal reflectors (B) 14 has a portion (D) 15 that gradually becomes thinner toward the tip and period (d) in FIG. 1 are commonly used in other embodiments.

Figure 2:
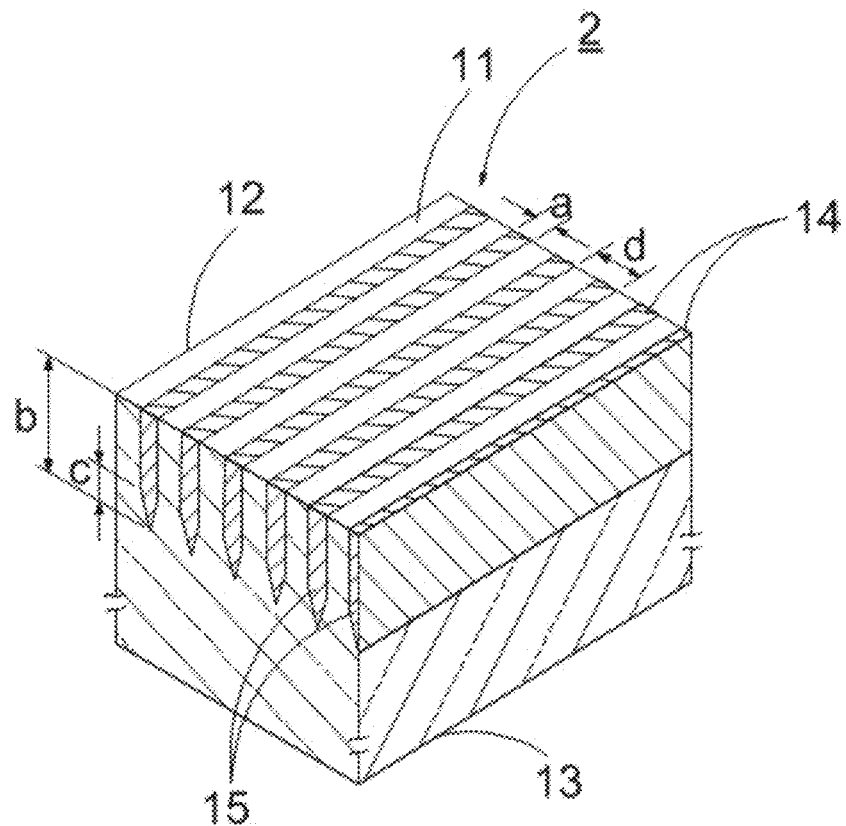
FIG. 2 is conceptual diagram showing an explanatory cross-section of the polarizer shown in FIG. 1, viewed from above at an angle.

FIG. 2 is an explanatory cross-sectional view of the wire-grid polarizer (R1) 2 viewed from above at an angle. In FIG. 2, the shape of each portion (D) 15 that gradually becomes thinner toward the tip of the metal reflector (B) 14 is an almost inverted triangular shape with the apex located toward the tip in the cross-section perpendicular to the one-dimensional grid array direction.

Figure 3:
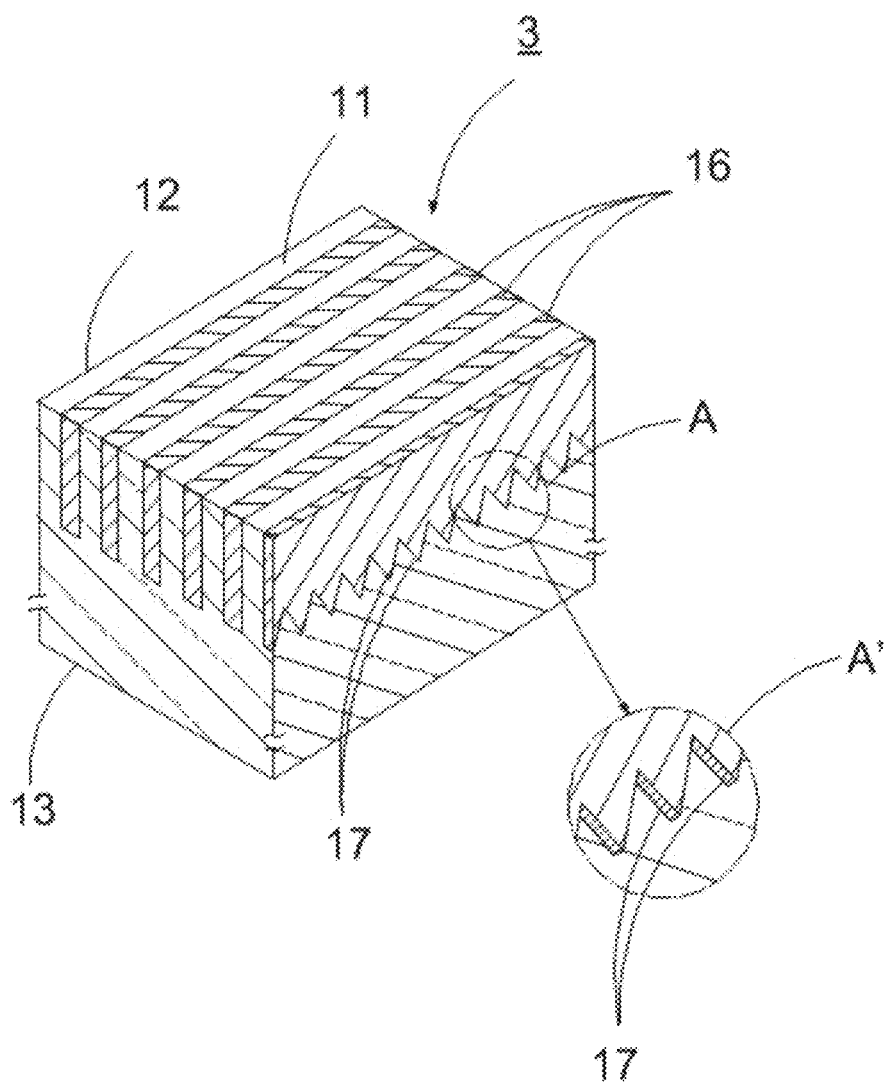
FIG. 3 is a conceptual diagram showing an explanatory cross-section of another example of the polarizer of the present invention viewed from above at an angle.

FIG. 3 is an explanatory cross-sectional view schematically showing another example of the wire-grid polarizer (R2) 3 viewed from above at an angle. In FIG. 3, the shape of each portion (D) 17 that gradually becomes thinner toward the tip of the metal reflector (B) 16 is an almost continuous triangular wave shape in the vicinity of the tip in a cross-section perpendicular to the front surface of the sheet (A) and in the one-dimensional grid array direction, and the apexes of the triangular wave shape are located in the tip direction.

Figure 4:
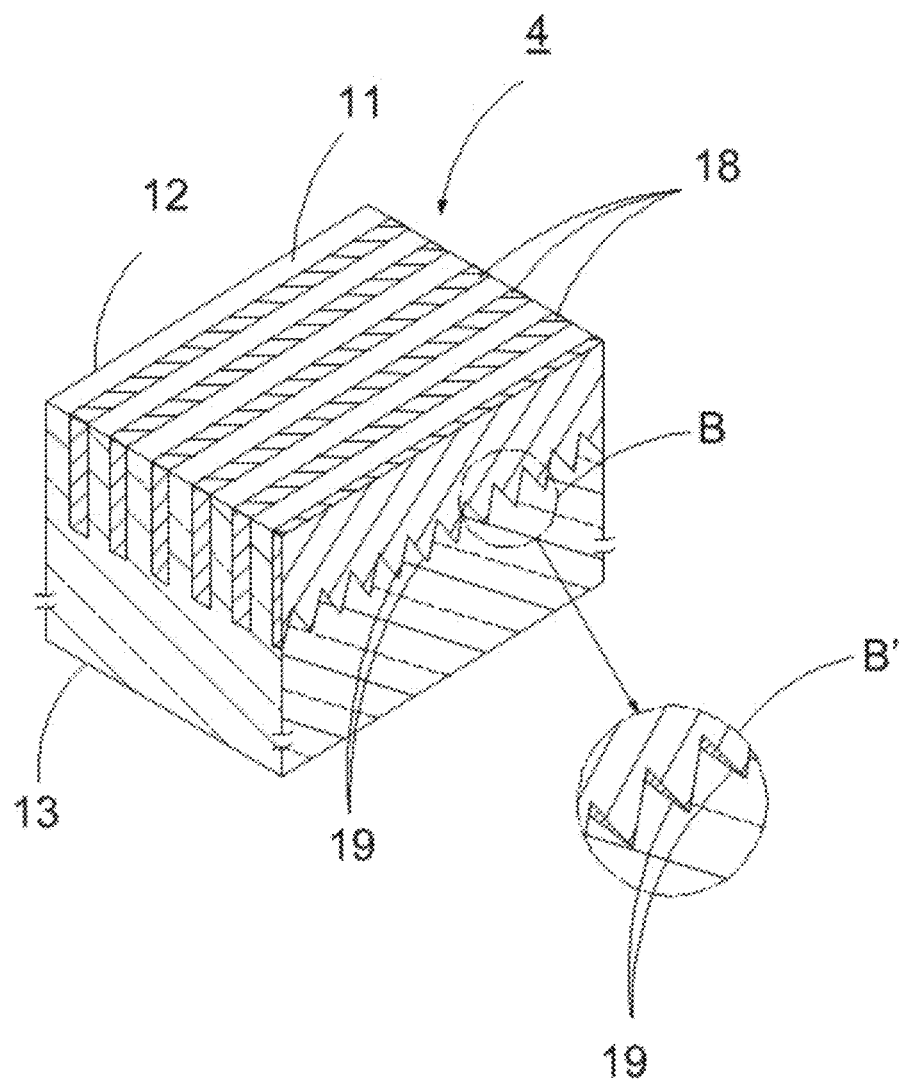
FIG. 4 is a conceptional diagram showing an explanatory cross-section of still another example of the polarizer of the present invention viewed from above at an angle.

FIG. 4 is an illustrative cross-sectional view schematically showing a further example of the wire-grid polarizer (R3) 4. In FIG. 4, the shape of each portion (D) 19 that gradually becomes thinner toward the tip of the metal reflector (B) 18 is such that almost quadrangular pyramid structures having an apex located in the tip direction or structures changing into an almost conical shape toward the apex from the bases of the almost quadrangular pyramid structures are continuous in the one-dimensional grid array direction.

Figure 5:
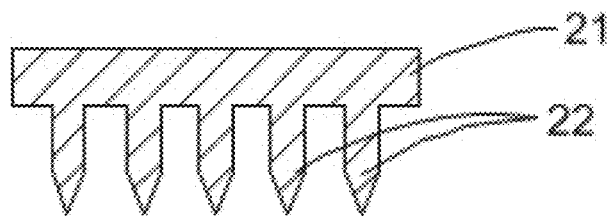
FIGS. 5(a) to 5(e) are cross-sectional views schematically showing an example of the manufacturing process of the wire-grid polarizer.
Figure 5:
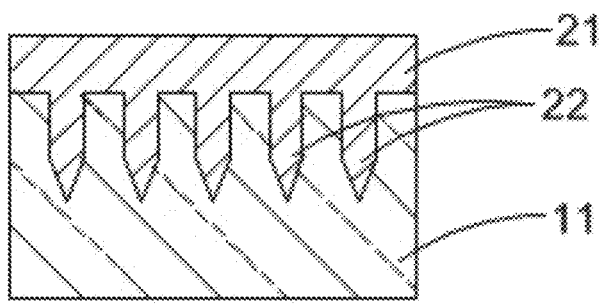
Figure 5:
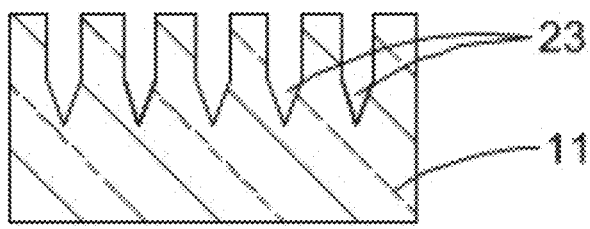
Figure 5:
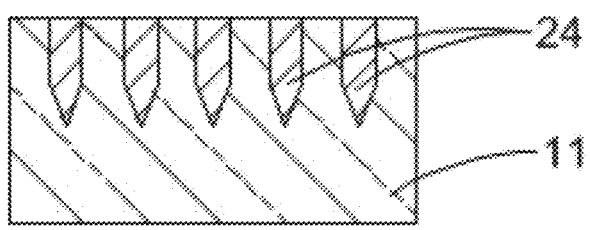
Figure 5:
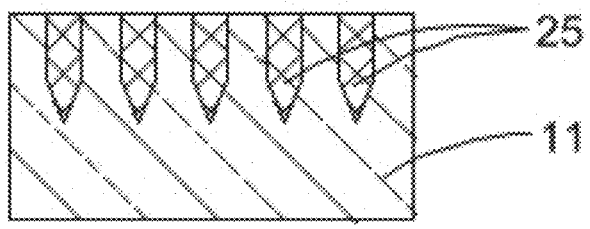

FIGS. 5(a) to 5(d) are schematic cross-sectional views showing an example of the manufacturing process of the wire-grid polarizer. FIG. 5(a) shows a mold 21 having convex parts 22 used to form grooves (C) in the sheet (A) 11, FIG. 5(b) shows that the mold 21 has been transcribed onto the sheet (A) 11 by the nanoimprinting method, and FIG. 5(c) shows the sheet (A) 11 having the formed grooves (C) 23, FIG. 5(d) shows that ink 24 containing metal fine particles has been filled into the grooves (C) 23 of the sheet (A), and FIG. 5(e) shows that a sintered body 25 has been formed by sintering the metal fine particles in the grooves (C) 23 of the sheet (A).

FIGS. 6 to 12 are scanning electron microphotographs (SEM) of molds used in the examples herein and these microphotographs will be explained in each example.

(1) Sheet (A)

(1-1) Surface Shape of Sheet (A)

Although a film having a thickness of 250 µm or less may be distinguished as a film and a film having a thickness of more than 250 µm may be distinguished as a sheet, since a sheet and a film may be both used as the sheet (A) in the present invention without distinguishing between them, both sheet and film are referred to as "sheet" in the specification of the present invention.

The surface shape of the sheet (A) is preferably flat from a practical standpoint, but may be curved with a gentle curvature. Such sheet (A) facilitates the formation of grooves (C) on the front surface of the sheet (A) by the nanoimprinting method, etc., and also facilitates post-treatment processes such as coating.

When the outer surface of each metal reflector (B) is embedded in the groove (C) in such a manner that it is almost flush with the surface of the sheet (A), it is scratch resistant, and, when it is rubbed or wiped, the polarizing function is hardly affected and the surface durability is excellent. In addition, the oxidation of the metal reflector (B) in the groove (C) hardly progresses and its heat and humidity resistance is also improved, thereby making it possible to maintain performance for a long time even in outdoor or high-temperature and high-humidity environments.

(1-2) Material of the Sheet (A)

Both organic and inorganic materials can be used for the sheet (A) that serves as the base material of the wire-grid polarizer of the present invention, as long as the sheet (A) is transparent for the electromagnetic waves of the target wavelengths such as those in visible and infrared regions, and the grooves having a one-dimensional grid pattern described below can be formed in the surface of the sheet (A).

In the present invention, "transparent sheet (A)" means a sheet having transparency high enough to maintain the required transmittance for the intended use, and may be transparent or translucent, and may also be colorless or colored. Translucent and colored sheets can be easily manufactured using known methods.

Preferred organic materials that can be used include polycarbonate resins, polyacrylic resins, polyamide resins, polyester resins, polyolefin resins, polycycloolefin resins, polyurethane resins, cellulose resins, polyvinyl chloride resins, polyether resins, polyarylate resins, and polysulfone resins, but not limited to these resins.

Although heat resistance and impact resistance can be improved when polycarbonate or the like is used for the sheet (A), there occurs a problem such as the production of colored interference fringes on the side where sunlight enters or the reduction of polarization degree when viewed from the transmitting side. As a means to solve this problem, it is preferable to control the retardation value (the product of the birefringence index of the sheet and its thickness) by stretching in one direction when a polycarbonate sheet or the like is obtained by extrusion molding. Although this retardation value is not particularly limited, a very low or high value is preferable, and in the case of a high value, it is preferable that the stretching axis of the sheet (A), which is the base material, be perpendicular to the absorption axis of the wire-grid polarization.

The inorganic materials that can be used include, but not limited to glass, silicon, quartz, and ceramic materials. Among the above materials, the use of organic materials is more preferable in consideration of processability such as the formation of grooves (C).

As the sheet (A), a single layer is preferable in consideration of expansion and contraction processes such as bending, but multiple layers are also acceptable.

(1-3) Shape of Groove (C) in Sheet (A)

The grooves (C) formed in the sheet (A) are formed to embed the metal reflectors (B).

Since the shape of the groove (C) is formed as a mold for forming the shape of the metal reflector (B) almost directly, the shape of the groove (C) will be explained in the section for the shape of the metal reflector (B) and the method of forming the shape of the groove (C) will be explained in the section for the manufacturing process of the wire-grid polarizer.

(2) Metal Reflectors (B)

(2-1) Material of Metal Reflector (B)

The constituent material of the metal reflector used in the present invention may be any metal material that has the function of reflecting light in the wavelength range of the light to be used. Specific examples of the constituent material include highly reflective metal materials such as aluminum, nickel, chromium, platinum, palladium, titanium, gold, silver and copper and mixtures of one or more of alloys thereof, and low-reflective metal materials such as molybdenum, tungsten, tantalum, zirconium, iron, niobium, hafnium, cobalt, and alloys thereof.

Among these, the use of highly reflective metallic materials is preferable in consideration of polarization. When the metal reflector (B) is formed by using means of sintering metal fine particles or plating means, it is preferable to select the metal material in consideration of these processing means.

(2-2) Shape and Structure of Metal Reflector (B)

In the wire-grid polarizer of the present invention, the shape of each of the metal reflectors (B) which are embedded in a large number of grooves (C) provided in the front surface of the transparent sheet (A) in a one-dimensional grid pattern in the same direction and with the same period is such that the average width (a) of the metal reflectors (B) is 200 nm or less, the ratio (b/a) of the average thickness (b) of the metal reflectors (B) from the front side of the sheet (A) to the tip in the backward direction to the above average width (a) is 4 to 25, in any cross-section perpendicular to the front surface of the sheet (A), the shape of each of the metal reflectors (B) in the vicinity of the tip in the thickness direction is such that it gradually becomes thinner in a linear or smoothly curved shape toward the tip, and the ratio (c/a) of the average length (c) toward the tip of the portions (D) that gradually become thinner toward the tip to the above average width (a) is 1.2 or more.

In addition, the grid pattern can be a one-dimensional grid pattern or a two-dimensional grid pattern. For example, the two-dimensional grid pattern is such that thin square materials are arranged horizontally and vertically with intervening spaces therebetween while the one-dimensional grid pattern is such that thin square materials are arranged with intervening spaces in either one of the directions. The one-dimensional grid pattern of the present invention means the latter one.

In order to achieve polarization performance for light of the wavelength to be used, the metal reflectors (B) in the grooves (C) of the sheet (A) must be arranged in a one-dimensional grid pattern (stripe shape) in the same direction and with the same period in the front surface of the transparent sheet (A). Since the metal reflectors (B) having the shape and structure described below are embedded they are scratch-resistant and even if they are rubbed or wiped, their polarizing function is hardly affected, and they have excellent surface durability.

Since the metal reflectors (B) are covered by the groove structure of the sheet (A), the number of exposed areas from the front surface can be reduced with the result that the oxidation of the metal reflectors (B) hardly progresses, thereby making it possible to maintain polarization performance for a long time even in outdoor or high-temperature and high-humidity environments.

(i) Average Width of Metal Reflectors (B)

The average width (a) of the metal reflectors (B) of the present invention is 200 nm or less in consideration of polarization degree and light transmittance, and the lower limit is preferably 25 nm or more and the upper limit is preferably 100 nm or less.

It is known that even for electromagnetic waves in the wavelength range that is not the visible light range, such as the ultraviolet, near-infrared, infrared, terahertz, or microwave range, the groove width is preferably $1/16$ to $1/4$ of the wavelength of the target electromagnetic wave.

(ii) Period of One-Dimensional Grid Pattern of Metal Reflectors (B)

The period (d) of one-dimensional grid pattern can be determined by the wavelength of the light intended to be polarized by the wire-grid polarizer. For example, the period (d) can be set to $1/5$ to $1/2$ of the intended light wavelength. Meanwhile, considering the transmittance of the light entering the wire-grid polarizer from the front side, the larger the period (d) is in relation to the average width (a), the higher the light transmittance will be. Therefore, the ratio (d/a) of the period (d) of the one-dimensional grid pattern of the metal reflectors (B) to the average width (a) is preferably 1.3 to 20. Considering balance with polarization degree, the lower limit value is more preferably 2 or more and the upper limit value is more preferably 8 or less.

(iii) Average Thickness (b) of Metal Reflectors (B)

The average thickness (b) of the metal reflectors (B) from the front side of the sheet (A) to the tip in the backward direction is set to ensure that the ratio (b/a) of the average thickness (b) to the average width (a) becomes 4 to 25. When the ratio (b/a) is 4 or more, the polarization degree improves, and the ratio is preferably 25 or less in consideration of mold processing and light transmittance. From a practical standpoint, the lower limit value is preferably 7 or more and the upper limit value is preferably 20 or less.

One feature of the wire-grid polarizer of the present invention is that the average thickness (b) of the metal reflectors (B) is increased as described above in order to improve the polarization degree of light incident from the front side. (iv) Average length (c) toward the tip of portions (D) that gradually become thinner toward the tip One feature of the wire-grid polarizer of the present invention is that the polarization degree can be improved by setting the ratio (b/a) of the average thickness (b) to the average width (a) of the metal reflectors (B) to 4 to 25 as described above.

Furthermore, in any cross-section perpendicular to the front surface of the sheet (A), for example, a cross-section perpendicular to the one-dimensional grid array direction or a cross-section parallel to the one-dimensional grid array direction, the shape of the metal reflector (B) in the vicinity of the tip in the thickness direction is such that it gradually becomes thinner in a linear or smoothly curved shape toward the tip, and the reflectance on the back side of the wire-grid polarizer can be reduced by setting the ratio (c/a) of the average length (c) in the tip direction of the portions (D) that gradually become thinner toward the tip to the above average width (a) to 1.2 or more, which is another feature of the present invention.

By setting the ratio (c/a) of the average length (c) toward the tip of the portions (D) that gradually become thinner toward the tip to the average width (a) to 1.2 or more, reflectance from the back side can be reduced.

Furthermore, in consideration of reflectance on the back side of incident light from the back side of the wire-grid polarizer and the processability of the mold, the above ratio (c/a) is preferably 1.2 to 8, the lower limit value is more preferably 1.5 or more, and the upper limit value is more preferably 5 or less.

(v) Embodiment of Portions (D) that Gradually Become Thinner Toward the Tip

The shape of each of the portions (D) that gradually becomes thinner toward the tip (may be referred to as "thinning portion (D)" hereinafter) in the vicinity of the tip in the thickness direction of the metal reflectors (B) is such that the portion gradually becomes thinner in a linear or smoothly curved shape toward the tip in any cross-section perpendicular to the surface of the sheet (A).

This shape is not particularly limited as long as it can be selected and formed from three-dimensional shapes such as polygonal columns, polygonal pyramids or combinations thereof. While preferred embodiments are exemplified in (v-1) through (v-3) below, the present invention is not limited to the following embodiments.

(v-1) Wire-Grid Polarizer (R1)

As shown schematically in the cross-sectional view for illustration of FIG. 2, the shape of the thinning portion (D) 15 of each metal reflector (B) 14 in the wire-grid polarizer (R1) 2 is an almost inverted triangular shape having an apex located in the tip direction in a cross-section perpendicular to the one-dimensional grid array direction.

Furthermore, in consideration of the reduction of reflectance on the back side, it is preferable that above inverted triangle is an almost inverted isosceles triangle.

(v-2) Wire-Grid Polarizer (R2)

As shown schematically in the cross-sectional view for illustration of FIG. 3, the shape of the thinning portion (D) 17 of each metal reflector (B) 16 in the wire-grid polarizer (R2) 3 is a continuous, almost triangular wave shape having apexes located in the tip direction in a cross-section perpendicular to the front surface of the sheet (A) and in the one-dimensional grid array direction.

Furthermore, in consideration of the reduction of reflectance on the back side, it is preferable that the above triangular wave shape is a continuous, almost isosceles triangular shape. In order to distinguish the shape shown in FIG. 3 from that in FIG. 4, the shape in the vicinity of the tip of the triangular wave is shown schematically in A' which is an enlarged view of A so that it can be recognized three-dimensionally.

(v-3) Wire-Grid Polarizer (R3)

As shown in the schematic cross-sectional view for explanation of FIG. 4, the shape of the thinning portion (D) 19 of each metal reflector (B) 18 in the wire-grid polarizer (R3) 4 is such that almost quadrangular pyramid structures having an apex located in the tip direction or structures gradually changing into an almost conical shape toward the apex from the base of the almost quadrangular pyramid structure are continuous in the one-dimensional grid array direction. Furthermore, in consideration of the reduction of reflectance on the back side, it is preferable that each of the above almost quadrangular pyramid structures should be an almost regular quadrangular pyramid structure.

In order to distinguish the shape shown in FIG. 4 from that shown in FIG. 3 above, the shape in the vicinity of the tip of the almost quadrangular pyramid structure is shown schematically in B' which is an enlarged view of B so that it can be recognized three-dimensionally.

Since the ratio (c/a) of the average length (c) toward the tip of the above-mentioned thinning portions (D) of the metal reflectors (B) to the average width (a) is as described above in all of the shapes shown in (v-1) to (v-3) above, the angles of the tips in the above-mentioned cross-sections fall within the almost same range, whereby the reflectance on the back side of incident light from the back side of each of the wire-grid polarizers drops.

(vi) Embodiments of Portion (D) that Gradually Becomes Thinner Toward the Tip

In the above embodiments (v-1) to (v-3) of the metal reflector (B) in the wire-grid polarizer, the shape of the thinning portion (D) of each metal reflector (B) can be further embodied in each of the following forms.

The shape of the thinning portion (D) of each metal reflector (B) can be such that,
in the case of the wire-grid polarizer (R1), the height toward the tip of the almost inverted triangular shape in the cross-section perpendicular to the front surface of the sheet (A) and in the one-dimensional grid array direction changes further continuously and regularly or irregularly,
in the case of the wire-grid polarizer (R2), the length of the base and the height toward the tip having an almost triangular wave shape in the cross section perpendicular to the front surface of the sheet (A) and in the one-dimensional grid array direction change further continuously and regularly or irregularly,
or, in the case of the wire-grid polarizer (R3), the length in the one-dimensional grid array direction and the height toward the tip of the almost quadrangular pyramid structure or the structure gradually changing into the almost conical shape toward the apex from the base of the almost quadrangular pyramid structure change further continuously and regularly or irregularly.

In these cases, the ratio (c/b) of the average length (c) toward the tip of the thinning portions (D) to the average thickness (b) of the above metal reflectors (B) is preferably set to 0.3 or less in all the wire-grid polarizers (R1) to (R3).

By changing the length toward the tip of the thinning portion (D) in the one-dimensional grid array direction continuously and regularly or irregularly in the above wire grid-polarizers (R1) to (R3), the reflectance on the back side of incident light from the back side can be reduced.

(vii) Structure of Metal Reflector (B) in Groove (C)

The evaporation method and the sputtering method are known as methods for forming absorption-type wire-grid polarizers.

However, as a method for forming the reflective wire-grid polarizer of the present invention, it is possible to form each metal reflector (B) in the one-dimensional grid pattern groove (C) formed in the transparent sheet (A) by using plating means or means of sintering ink containing metal fine particles. It is particularly preferable to form the metal reflector (B) composed of a sintered body of metal fine particles by using the means of sintering ink containing metal fine particles as described hereinafter.

Although the metal reflectors (B) are embedded in the grooves (C) in the sheet (A) in a shape that ensures the above average width (a), the average thickness (b) and the average length (c) toward the tip of the portions (D) that gradually become thinner toward the tip, they may be embedded in the grooves (C) as a single continuous structure or in such a manner that a plurality of block-like structures are stacked at a high density independently or partially or fully bonded together on the outer surfaces thereof.

When each of the metal reflectors (B) is formed by plating means, the above single continuous structure can be formed in the groove (C), and when the metal reflector (B) is formed by the means of sintering metal fine particles, the plurality of block-like structures can be formed in the groove (C) by controlling the sintering conditions in such a manner that they are stacked independently or partially or fully bonded together on the outer surfaces thereof.

(II) Manufacturing Process of Wire-Grid Polarizer

The process for manufacturing the wire-grid polarizer of the present invention comprises the step of forming a large number of grooves (C) in a one-dimensional grid pattern in the same direction and with the same period in the front surface of a transparent sheet (A) by the nanoimprinting method and the step of embedding metal reflectors (B) in the grooves (C).

The structure of each of convex parts for forming the large number of grooves (C) in a mold used to form the grooves (C) in the sheet (A) by the above nanoimprinting method is characterized in that the average width (a') is 200 nm or less, the ratio (b'/a') of the average length (b') toward the tip to the average width (a') is 4 to 25, the shape of each convex part in the vicinity of the tip is such that it gradually becomes thinner in a linear or smoothly curved shape toward the tip, and the ratio (c'/a') of the average length (c') toward the tip of the portions (D') that gradually become thinner toward the tip to the above width (a') is 1.2 or more.

The wire-grid polarizer can be manufactured by forming a large number of grooves (C) provided in one-dimensional grid pattern in the same direction and with the same period in the surface of the transparent sheet (A) and then embedding each metal reflector (B) in the grooves (C). It is generally known that nanoimprinting, injection molding, exposure techniques such as electron beam lithography, focused ion beam, and interference exposure, and self-organization techniques using nanoparticles, etc. can be used to form the above grooves (C).

The manufacturing process of the wire-grid polarizer of the present invention is a simple and practical process in which the fine grooves (C) are formed in the surface of the sheet (A) using the nanoimprinting method, and then each metal reflector (B) is embedded in the grooves (C).

FIG. 5(a) is a schematic cross-sectional view of a mold 21 having convex parts 22. The shapes of the convex parts 22 are transferred to the sheet (A) 11 by using the mold 21 as shown in FIG. 5(b) to form the grooves (C) 23 in the sheet (A) 11 as shown in FIG. 5(c). Next, as shown in FIG. 5(d), the grooves (C) are filled with ink 24 containing metal fine particles, and then the metal fine particles in the grooves (C) are sintered in the sintering step to form a sintered body 25 of the metal fine particles in the grooves (C) as shown in FIG. 5(e).

Since the structure of each of the convex parts of the above mold has the same shape as that of each of the metal reflectors (B) of the wire-grid polarizer, the average width (a'), average length (b'), and the average length (c) toward the tip of the portions (D') that gradually become thinner toward the tip of the mold structure correspond to the average width (a), the average thickness (b) and the average length (c) toward the tip of the portions (D) that gradually become thinner toward the tip of the metal reflectors (B) of the wire-grid polarizer, respectively.

Since the explanation of the structure of the convex part of the mold is the same as the explanation of the structure of the metal reflector (B), the explanations of these structures are omitted here. As for the process of manufacturing the wire-grid polarizer of the present invention, the step of forming grooves (C) in the front surface of the sheet (A) (first step) and the step of embedding the metal reflectors (B) into the grooves (C) (second step) will be described separately.

(1) First Step (Step of Forming Grooves (C) in Front Surface of Sheet (A))

The first step is a step of forming a large number of grooves (C) in one-dimensional grid pattern in the same direction and with the same period in the front surface of the transparent sheet (A) by the nanoimprinting method.

The structure of each of the convex parts forming the grooves (C) in the mold used to form the grooves (C) in the sheet (A) is characterized in that the average width (a') is 200 nm or less, the ratio (b'/a') of the average length (b') in the tip direction to the average width (a') is 4 to 25, the shape of each convex part in the vicinity of the tip is such that it gradually becomes thinner in a linear or smoothly curved shape toward the tip, and the ratio (c'/a') of the average length (c') toward the tip of the portions (D') that gradually become thinner toward the tip to the above average width (a') is 1.2 or more.

The nanoimprinting process for forming grooves (C) in the front surface of the sheet (A) in the first step is technology for copying (imprinting) onto the sheet (A) to be processed even a concavo-convex structure as fine as several tens of nanometers formed on the mold of the above shape using a press device and a scaled-down version of embossing or imprinting technology in conventional processes. As mentioned above, FIG. 5(a) shows the mold 21 having convex parts 22 used to form grooves (C) in the sheet (A) 11, FIG. 5(b) shows that the mold 21 has been imprinted on the sheet (A) 11 by the nanoimprinting method, and FIG. 5(c) shows the sheet (A) 11 in which the grooves (C) 23 have been formed.

Since a pressure as high as several MPa is usually applied for imprinting, silicon is a preferred material for the mold. However, it is possible to use glass such as quartz, ceramics such as alumina and silicon carbide, and nickel, which have a certain degree of strength, and it is also possible to use multi-layer materials including metal, semiconductor and dielectric layers on these materials. The mold can be processed by using semiconductor and photomask manufacturing technologies using the above materials.

Nanoimprinting methods include thermal nanoimprinting, in which the sheet (A) is made of a thermoplastic resin or glass and photocuring nanoimprinting in which the material to be processed is a photocurable resin, both of which enable the microstructure of the mold to be directly inverted and copied onto the transfer target.

In the thermal nanoimprinting method, when the thermoplastic resin to be processed is an amorphous resin, it is desirable to transfer the shape at a temperature about 20° C. higher than the glass transition temperature (Tg) at which rigidity and viscosity begin to drop and, when the material to be processed is a crystalline resin, it is desirable to transfer the shape while the material is heated at a temperature higher than the melting point.

In the curing type nanoimprinting method, when an ultraviolet curable resin is used, since quartz which transmits ultraviolet light is used for the mold and the viscosity of the resin before curing is lower than that in the case of thermal nanoimprinting, fine shapes and shapes having a high-aspect ratio can be transferred well.

In the nanoimprinting method, a fluorine release agent is preferably used as the release agent which is applied to the mold, while a silicon release agent can be used depending on the mold (die) material or resin material to be molded. In the step of forming the grooves in the sheet (A), mass production is possible using the roll-to-roll method or batch method.

(2) Second Step (Step of Embedding Metal Reflectors (B) into Grooves (C))

There are no particular restrictions on the means of embedding each metal reflector (B) in the groove (C), and known technologies such as means of sintering fine particles, plating means, physical vapor deposition method, chemical vapor deposition method, etc. can be used. Since the means of sintering metal fine particles out of these is highly practical and relatively easy to operate, a specific example using the means of sintering metal fine particles is described below.

When the means of sintering metal fine particles is used, the step of embedding the metal reflectors (B) consists of the sub-step of filling ink or paste (both to be collectively referred to as "ink" hereinafter) containing metal fine particles into the grooves (C) of the sheet (A) (ink filling sub-step) and the sub-step of sintering (firing) the metal fine particles by heating the filled ink (metal fine particle sintering sub-step).

As described above, FIG. 5(d) shows that ink 24 containing metal fine particles has been filled into the grooves (C) 23 of the sheet (A) and FIG. 5(e) shows that the metal fine particles in each of the grooves (C) 23 of the sheet (A) have been sintered to form a sintered body 25.

(i) Ink Filling Sub-Step

The ink is preferably ink which contains metal fine particles having an average particle diameter smaller than the average width (a) of the metal reflectors (B), preferably not more than ½ of the average width (a), uniformly dispersed in a solvent containing a dispersant such as amine compound or gelatin for covering at least the surface of each of the metal fine particles and a high-boiling point organic solvent and which has a metal fine particle content of 60 to 90 mass %.

The dispersant such as an amine compound is a dispersant containing at least one compound having a group containing nitrogen, oxygen or sulfur atom, and the high-boiling point organic solvent is preferably a non-polar or low-polar solvent, such as an alkane having 10 or more carbon atoms (such as tetradecane) or a primary alcohol having 10 or more carbon atoms (such as 1-decanol). The ink which can be used in the present invention is commercially available as shown in Examples and readily available.

The material of the metal fine particles is the same as the constituent material of the above metal reflectors (B) and preferably one or a mixture of two or more selected from highly reflective metal materials such as aluminum, nickel, chromium, platinum, palladium, titanium, gold, silver, copper, and alloys thereof. Among these, silver is preferred in view of availability.

Fine patterns can be drawn with ink containing the above components, and when the metal fine particles are sintered by heating, the dispersant such as an amine compound is released from the surfaces of the metal fine particles, thereby activating the surfaces of the metal fine particles to promote sintering.

Since the width of each of the grooves (C) is nano-sized, when the ink is filled into the grooves (C) of the sheet (A), it is possible to fill the ink by using capillary action, and therefore, it is desirable to select ink whose contact angle with the sheet (A) is preferably 0° or more and less than 90°, more preferably 0° to 60°.

Furthermore, considering that it is easy to fill ink when the wettability of ink (contact angle with ink) with the surface inside the groove (C) is greater than the wettability of ink with the surface of the sheet (A), it is desirable to form on the surface of the sheet (A) a liquid-repellent film whose contact angle with the ink is greater than the contact angle of the ink with the surface inside the groove (C).

It is desirable to form the liquid-repellent film before the grooves (C) are formed in the sheet (A). As a specific method for this, the film is formed directly on the surface of the sheet by plasma treatment with methane tetrafluoride ($CF_4$) in gaseous form, or by applying a solution of organosilane diluted and dissolved in a fluorinated solvent (organosilane concentration: about 0.1 mass %) to the sheet and then evaporating the fluorinated solvent, or by forming a self-assembled monolayer. The liquid-repellent film not only facilitates the filling of ink into the grooves (C), but also functions as a protective film for preventing the sintered metal fine particles from adhering to unnecessary locations on the sheet (A).

As a method of filling the grooves (C) with ink, a method using a squeezee or a doctor blade is preferred, but a method in which ink is brought into contact with the groove (C) structure, such as ink jet method, droplet application with a dispenser, spin coating and dip coating may also be used. When a liquid repellent film is formed on the front surface of the sheet (A), it is preferable to apply pressure by squeezee or doctor blade for filling.

Although the front surface of the sheet is preferably wiped directly to selectively remove excess ink remaining on the front surface of the sheet (A), after filling the above-mentioned grooves (C) with ink, it can be cleaned by polishing, ultrasonic cleaning, high-pressure jet cleaning, etc., or excess ink can be removed by pressing an ink-absorbent material against the front surface of the sheet (A).

(ii) Sub-Step of Sintering Metal Fine Particles

The sub-step of sintering metal fine particles is a sub-step for forming each metal reflector (B) in the groove (C) by heating the sheet (A) having the grooves (C) filled with ink to the groove (C) to evaporate the dispersant and organic solvent, etc., contained in the ink and sintering the metal fine particles. In most cases of sintering in a liquid phase, no external pressure is required because the capillary action of the liquid phase creates sufficient internal pressure between the solid phase particles (the magnitude of the capillary force corresponds to a very high external pressure).

Although a heating oven is preferably used to control the sintering degree of the metal fine particles, it is possible to use sintering equipment such as hot plates, plasma sintering equipment, microwave sintering equipment, flash lamp light sintering equipment and laser sintering equipment.

Although the sintering temperature and the time required for sintering depend on the composition of the metal particles, the particle size, the dispersant used in the ink, and the dispersant and the organic solvent used in the ink, in general, the sintering temperature is preferably 80-200° C., more preferably 100-160° C. The sintering time can be determined arbitrarily in consideration of the sintering temperature.

When the liquid-repellent film is formed on the surface of the sheet (A), the wire-grid polarizer of the present invention can be obtained by peeling off the liquid-repellent film after the end of sintering.

EXAMPLES

The following examples and comparative examples are provided for the purpose of further illustrating the present invention but are in no way to be taken as limiting.

In these examples and comparative examples, polarization degree, light transmittance, and light reflectance of the prepared specimens were measured using the following apparatus.

(i) Measurement of Polarization Degree and Light Transmittance

A spectrophotometer (model: SolidSpec-3700) manufactured by Shimadzu Corporation was used. Incident light having electric field components oscillating in directions parallel and perpendicular to the metal reflectors of the fabricated wire-grid polarizer was used, and random polarization incident light was used for the measurement of light reflectance.

Polarization characteristics were evaluated by polarization degree.

Assuming that the visual transmittance of a polarized light beam parallel to the metal reflectors is represented by Tp and that of a polarized light beam perpendicular to the metal reflector is represented by Tv, the polarization degree V is obtained from $V=\sqrt{((Tv-Tp)/(Tv+Tp))}$.

The visual transmittance at each polarization degree can be obtained from transmittances (transmission spectra) (in 1 nm increments) and visibility curves at wavelengths of 380 to 780 nm.

(ii) Measurement of Light Reflectance

A microspectrometer (model: USPM-RUIII) manufactured by Olympus Corporation was used.

The visual transmittance T can be obtained from $T=(Tv+Tp)/2$. As the visual reflectance R in the case of reflectance, a value obtained from reflection spectra and visibility curves was used because of random polarization.

Example 1

A microgroove structure was formed in the surface of a thermoplastic resin sheet by the thermal nanoimprinting method using a mold, followed by filling the grooves with ink containing silver microparticles, and then sintering the silver microparticles contained in the ink in a heated oven to prepare a polarizer specimen of the same type as the wire-grid polarizer (R1) described above.

The obtained polarizer specimen had an irregularly continuous concavo-convex shape at the tips in the one-dimensional grid array direction and in a cross-section perpendicular to the surface of the sheet.

(1) Formation of Microgroove Structure in Sheet Surface

A polycarbonate sheet (manufactured by Mitsubishi Engineering-Plastics Corporation, product name: FE-2000, thickness: 400 μm) was used as the transparent sheet. A mold used was made by microfabricating a 4-inch silicon wafer. As shown in Table 1 and notes thereof, the microstructure of the mold used had a convex shape for forming the grooves in the sheet, corresponding to the wire-grid polarizer (R1), the average width (a') of the convex parts was 42.1 nm, and the period (d') of the array was 140 nm.

The average length (b') up to the tip of the convex parts was 499.8 nm, the average length (c') toward the tip of portions that gradually become thinner toward the tip was 100 nm, the tips of the portions that gradually become thinner toward the tip formed an irregularly continuous concavo-convex shape in the array direction of the convex parts, 90% or more of the portions had a height difference in the concavo-concave shape of 120 nm or less, and the ratio (c'/b') of the above average length (c') to the average length (b') of the metal reflectors was 0.3 or less.

Figure 6:
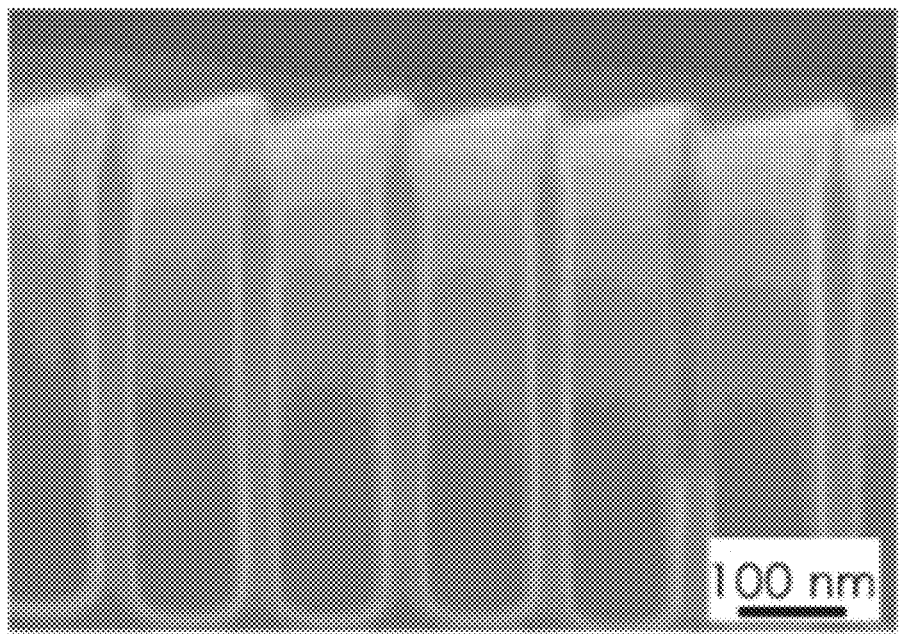
FIG. 6 is a scanning electron microphotograph (SEM) of a mold used in Example 1 observed from diagonally above the front of the mold.
Figure 7:
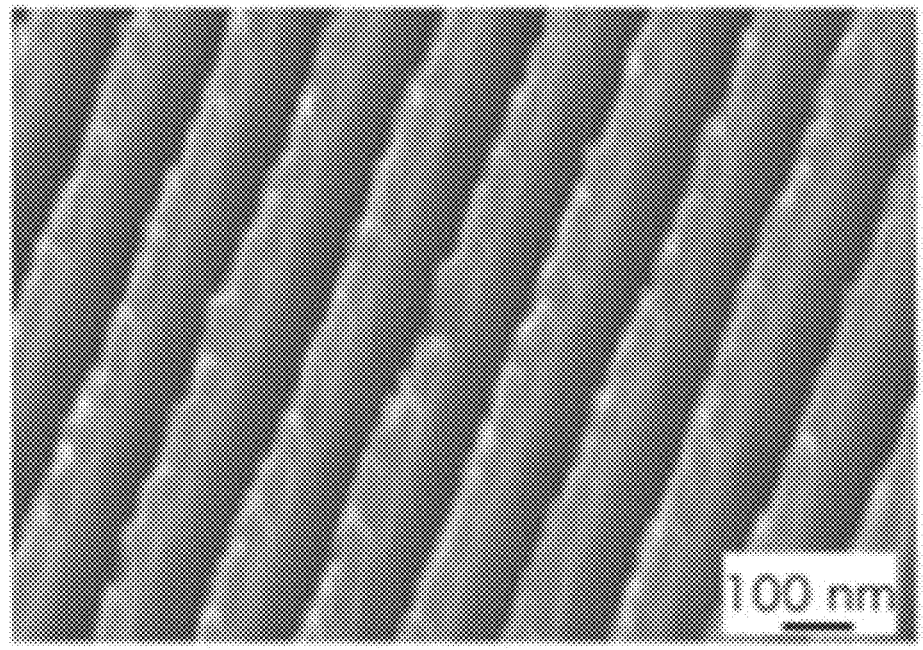
FIG. 7 is an SEM of a mold used in Example 1 observed from above at an angle.
Figure 8:
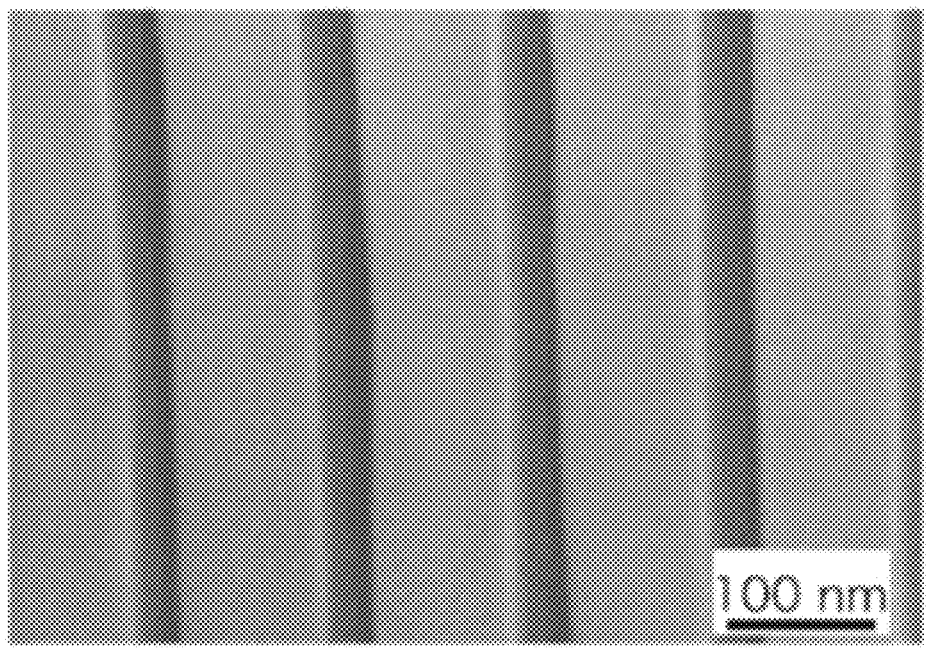
FIG. 8 is a schematic front view of a transparent sheet having grooves formed by the nanoimprinting method in Example 1.

Using this mold, the microgroove structure was transferred to the sheet surface by the thermal nanoimprinting method. FIG. 6 is a scanning electron microphotograph (SEM) of the mold used in Example 1 observed from diagonally almost above the front of the mold. FIG. 7 is a SEM of the mold used in Example 1 observed from above at an angle. FIG. 8 is a schematic front view of the transparent sheet with grooves formed by the nanoimprinting method.

(2) Filling of Ink in Microgrooves of Sheet

Silver nano-ink (manufactured by HARIMA CHEMICALS GROUP, INC, product name: NPS, silver particle content: 85 mass %, average particle diameter: 12 nm, contact angle with the sheet: less than 60 degrees) was filled into the grooves using the squeezing method. Then, excess ink adhering to areas other than the inside of the grooves was removed by wiping.

(3) Preparation of Polarizer Specimen by Sintering

The sheet having the grooves filled with the above ink was placed in an oven heated at 130° C. for 12 hours to sinter the silver fine particles contained in the ink so as to fabricate a polarizer specimen.

(4) Evaluation Results

It was confirmed that silver nanoparticles grown to several tens of nm in size were lined up along the grooves in the upper part of the grooves of the obtained wire-grid polarizer specimen. It was also confirmed that silver nanoparticles grown up to about 100 nm were stacked inside the grooves and at least partially bonded to each other on their outer surfaces, thereby forming a pattern composed of silver particles having a size distribution inside the grooves. The obtained wire-grid polarizer specimen was measured for polarization degree, light transmittance, and light reflectance.

These results are shown in Table 1. As shown in Table 1, good results were obtained for both the polarization degree and backside light reflectance of the polarizer specimen obtained with the mold shape used in Example 1.

Examples 2 and 3

In Examples 2 and 3, microgroove structures were formed in the surfaces of the sheets using molds in the same manner as in Example 1, and, after ink was filled into the grooves, they were sintered to produce polarizer specimens which were of the same type as the wire-grid polarizer (R1) and had an irregularly continuous concavo-convex shape at the tips in a cross-section perpendicular to the sheet surface and in the one-dimensional grid array direction as in Example 1.

(1) Preparation of the Polarizer Specimens

The same transparent sheets as that used in Example 1 were used. As shown in Table 1 and notes thereof, the microstructures of the molds used were such that the shape of each of the convex parts for forming the grooves was the same as that of the above wire-grid polarizer (R1), the average width (a') of the convex parts was 42.1 nm in Example 2 and 30.7 nm in Example 3, and the period (d') of the array was 140 nm in Examples 2 and 3.

The average length (b') up to the tip of the convex parts was 499.8 nm in Example 2 and 388.5 nm in Example 3, the average length (c') toward the tip of portions that gradually become thinner toward the tip was 100 nm in Example 2 and 80 nm in Example 3, the tips of portions that gradually become thinner toward the tip had an irregularly continuous concavo-convex shape in the array direction of the convex parts, 90% or more of the portions had a height difference in the concavo-convex shape of 120 nm or less in Example 2 and 100 nm or less in Example 3, and the length (c') in the tip direction of the portions that gradually become thinner toward the tip was 0.3 time or less the above average length (b') in Examples 2 and 3.

The average length (b') to the tip of the convex parts was 499.8 nm in Example 2 and 388.5 nm in Example 3, and the average length (c') toward the tip of each portion that gradually became thinner toward the tip was 100 nm in Example 2 and 80 nm in Example 3. Using these molds, the microgroove structures were transferred to the sheet surfaces by the thermal nanoimprinting method.

Then, silver nano-ink similar to that used in Example 1 was filled into the grooves by the squeezing method, and after filling, excess ink adhering to areas other than inside the grooves was removed by wiping.

Then, the sheets having the grooves filled with the above ink were heated at 130° C. in an oven for 81 hours in Examples 2 and for 12 hours in Example 3 to sinter the silver fine particles contained in the ink so as to prepare polarizer specimens.

(2) Evaluation Results

The polarization degree, light transmittance, and light reflectance of the obtained polarizer specimens were measured.

These results are shown in Table 1. As shown in Table 1, both the polarization degree and the light reflectance on the back side of the polarizer specimens fabricated with the mold shapes used in Examples 2 and 3 showed good results.

Examples 4, 5 and 6

Microgroove structures were formed in the surfaces of thermoplastic resin sheets by the thermal nanoimprinting method using molds, and then ink containing silver microparticles was filled into the grooves, followed by sintering of the silver microparticles contained in the ink in a heated oven to prepare polarizer specimens which were of the same type as the wire-grid polarizer (R1) and had an almost linear shape at the tips in a cross-section perpendicular to the surface of the sheet and in the one-dimensional grid array direction.

(1) Preparation of Polarizer Specimens

The same sheets as used in Example 1 were used. The microstructures of the molds used were such that the shape of each of convex parts forming the grooves was an inverted shape of the groove formed in the above wire-grid polarizer (R1), and the average width (a'), average length (b'), the average length (c') toward the tip of the portions that gradually become thinner toward the tip and the period (d') of the array are as shown in Table 1 and notes thereof.

Figure 9:
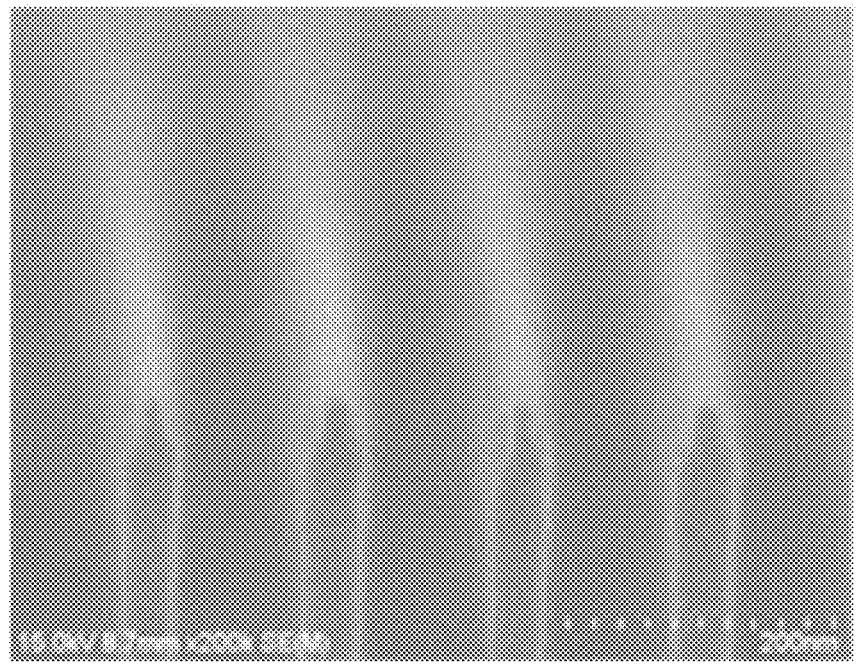
FIG. 9 is an SEM of a mold used in Example 4 observed from diagonally above the front of the mold.
Figure 10:
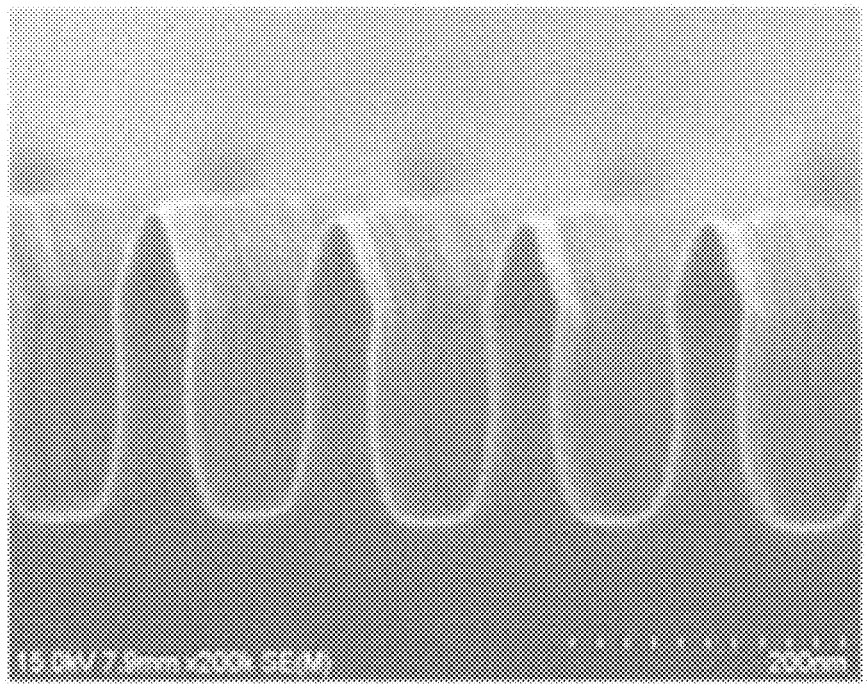
FIG. 10 is an SEM of a mold used in Example 6 observed from the right side of the front of the mold.

Using these molds, the microgroove structures were transferred to the sheets by thermal nanoimprinting. FIG. 9 is a scanning electron microphotograph (SEM) of the mold used in Example 4 observed from diagonally above almost the front of the mold and FIG. 10 is a scanning electron microphotograph (SEM) of the mold used in Example 6 observed from the right side of almost the front of the mold.

Then, silver nano-ink similar to that used in Example 1 was filled into the grooves by the squeezing method, and after filling, excess ink adhering to areas other than the grooves was removed by wiping. Thereafter, the sheets having grooves filled with the ink were placed in an oven heated to 130° C. for 12 hours to sinter the silver particles contained in the ink so as to fabricate polarizer specimens.

(2) Evaluation Results

The polarization degree, light transmittance, and light reflectance of the obtained polarizer specimens were measured. These results are shown in Table 1. For the polarizer specimens fabricated with the molds having the above shape used in Examples 4 and 5, good results were obtained for both the polarization degree and the light reflectance on the back side. The ratio (b/a) of the average thickness (b) to the average width (a) of the polarizer specimen fabricated with the average length (b') and the average width (a') of the convex parts of the mold used in Example 6 was 4.4, and it was confirmed that the polarization degree of the polarizer having such a metal reflector shape was improved.

Examples 7, 8, 9

Microgroove structures were formed in the surfaces of thermoplastic resin sheets by the thermal nanoimprinting method using molds, then the grooves were filled with ink containing silver fine particles, and then the silver fine particles after that the silver microparticles contained in the ink were sintered in a heated oven to fabricate polarizer specimens of the same type as the wire-grid polarizer (R3).

(1) Preparation of Polarizer Specimens

The same sheet as that used in Example 1 were used. The microstructures of the molds used were such that the shape of each of the convex parts forming the grooves was an inverted shape of the groove formed in the above wire-grid polarizer (R3), and the average width (a'), the average length (b'), the average length (c') toward the tip of portions that gradually become thinner toward the tip and the period (d) of the array were as shown in Table 1 and notes thereof.

The shape of each of the portions that gradually becomes thinner toward the tip in the vicinity of the tip in the thickness direction of the metal reflectors was such that the length in the one-dimensional grid array direction and the height in the tip direction of the base of an almost quadrangular pyramid structure or a structure that gradually changes into an almost conical shape toward the apex from the base of the quadrangular pyramid structure change irregularly and continuously, 90% or more of the portions in Examples 7 to 9 had a height difference of 120 nm or less, and the ratio (c'/b') of the average length (c') toward the tip of the portions that gradually become thinner toward the tip to the average length (b') of the metal reflectors was 0.3 or less.

Figure 11:
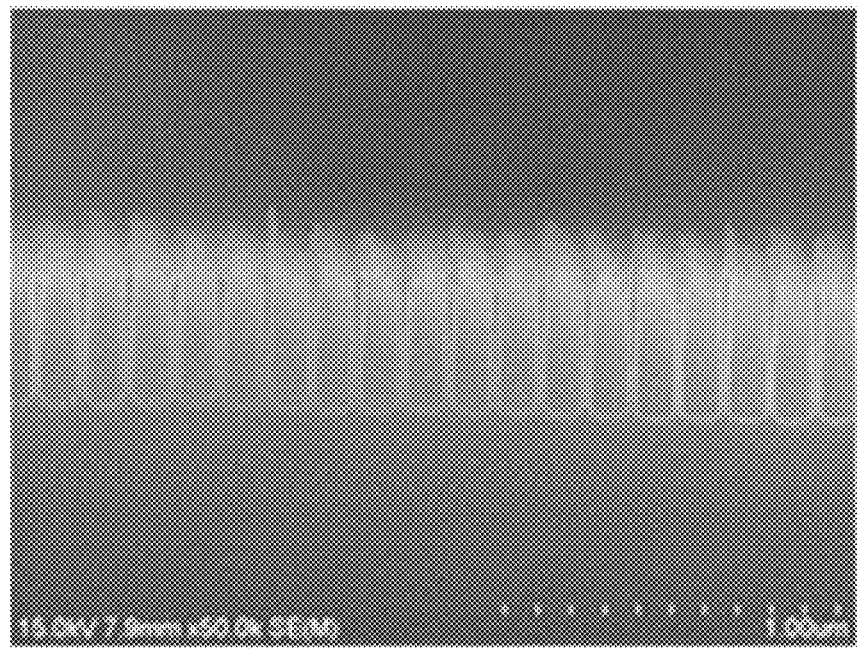
FIG. 11 is an SEM of a mold used in Example 8 observed from diagonally above the front of the mold.

Using these molds, the microgroove structures were transferred to the surfaces of the sheets by the thermal nanoimprinting method. FIG. 11 is a scanning electron microphotograph (SEM) of the mold used in Example 8 observed from diagonally almost above the front of the mold.

Then, the same silver nano-ink as used in Example 1 was filled into the grooves by the squeezing method, and after filling, excess ink adhering to areas other than the grooves was removed by wiping.

Then, the sheets having grooves filled with the above ink were placed in an oven heated at 130° C. for 128 hours in Example 7 and for 81 hours in Examples 8 and 9 to sinter the silver fine particles contained in the ink so as to fabricate polarizer specimens.

(2) Evaluation Results

The polarization degree, light transmittance, and light reflectance of each of the obtained polarizer specimens were measured. These results are shown in Table 1. For the polarizer specimens fabricated with the molds used in Examples 7 to 9, good results were obtained for both the polarization degree and the light reflectance on the back side.

Comparative Examples 1 and 2

Microgroove structures were formed in the surfaces of thermoplastic resin sheets by the thermal nanoimprinting method using the molds, and then ink containing silver fine particles were filled into the grooves, followed by sintering of the silver fine particles contained in the ink in a heated oven to fabricate polarizer specimens which were of the same type as the wire-grid polarizer (R1) and had an almost linear shape at the tips in a cross-section perpendicular to the surface of the sheet and in the one-dimensional grid array direction.

(1) Preparation of the Polarizer Specimens

The same sheets as used in Example 1 were used. The microstructures of the molds used were such that the shape of each of the convex parts forming the grooves was an inverted shape of the groove formed in the above wire-grid polarizer (R1), and the average width (a'), the average length (b'), the average length (c') toward the tip of portions that gradually became thinner toward the tip and the period (d') of the array are as shown in Table 1 and notes thereof.

Figure 12:
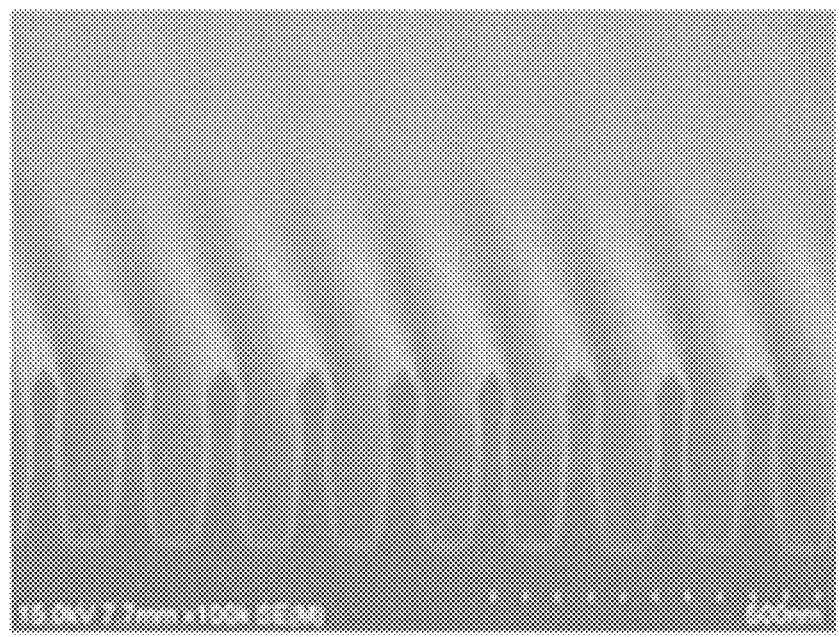
FIG. 12 is an SEM of a mold used in Comparative Example 2 observed from diagonally above the front of the mold.

Using these molds, the microgroove structures were transferred to the sheet surfaces by the thermal nanoimprinting method. FIG. 12 is a scanning electron microphotograph (SEM) of the mold used in Comparative Example 2 observed from diagonally almost above the front of the mold.

Then, the same silver nano-ink as used in Example 1 was filled into the grooves by the squeezing method, and after filling, excess ink adhering to areas other than the grooves was removed by wiping.

Then, the sheets having the grooves filled with above ink were placed in an oven heated to 130° C. for 12 hours in Comparative Example 1 and 81 hours in Comparative Example 2 to sinter the silver particles contained in the ink, so as to fabricate polarizer specimens.

(2) Evaluation Results

The polarization degree, light transmittance, and light reflectance of each of the obtained polarizer specimens were measured. These results are shown in Table 1. In the polarizer specimen obtained with the mold shape used in Comparative Example 1, it was confirmed that the polarization degree drops when the ratio (b/a) of the average thickness (b) to the average width (a) of the metal reflectors is 3.5. In addition, in the polarizer specimens obtained with the mold shapes used in Comparative Examples 1 and 2, it was confirmed that when the ratio (c/a) of the average length (c) toward the tip of portions that gradually become thinner toward the tip to the average width (a) is 1.0, the reflectance on the back side becomes slightly high and when the ratio is 0.89, the light reflectance on the back side becomes even higher.

TABLE 1

|  | The shape of the mold | | | | Evaluation results | | | |
| --- | --- | --- | --- | --- | --- | --- | --- | --- |
|  | average width (a') (a') (nm) | average length (b') (b') (nm) | ratio of (b'/a') (—) | ratio of (c'/a')*1 (—) | ratio of (d'/a')*2 (—) | polarization degree (%) | light transmittance (%) | light reflectance | |
|  |  |  |  |  |  |  |  | surface side (%) | back side (%) |
| Example 1 | 42.1 | 499.8 | 11.9 | 2.4 | 3.3 | 97.7 | 17.2 | 8.3 | 3.7 |
| Example 2 | 42.1 | 499.8 | 11.9 | 2.4 | 3.3 | 99.0 | 13.6 | 6.2 | 3.6 |
| Example 3 | 30.7 | 388.5 | 12.7 | 2.6 | 4.6 | 96.3 | 24.7 | 5.4 | 3.9 |
| Example 4 | 37.9 | 472.5 | 12.5 | 1.6 | 3.7 | 96.6 | 13.8 | 8.4 | 7.5 |
| Example 5 | 41.1 | 484.0 | 11.7 | 1.5 | 3.4 | 96.2 | 13.0 | 10.6 | 6.9 |
| Example 6 | 48.3 | 214.0 | 4.4 | 1.2 | 2.9 | 77.1 | 14.1 | 4.8 | 7.9 |
| Example 7 | 30.0 | 375.5 | 12.5 | 3.7 | 4.7 | 97.2 | 22.6 | 6.5 | 4.4 |
| Example 8 | 25.6 | 381.6 | 14.9 | 4.7 | 5.5 | 98.1 | 20.3 | 10.2 | 3.7 |
| Example 9 | 24.0 | 363.3 | 15.1 | 7.5 | 5.8 | 96.2 | 27.4 | 7.1 | 3.7 |
| Comparative Example 1 | 52.4 | 183.3 | 3.5 | 1.0 | 2.7 | 69.9 | 24.4 | 6.5 | 11.1 |
| Comparative Example 2 | 44.9 | 277.8 | 6.2 | 0.89 | 3.1 | 94.8 | 6.0 | 12.7 | 22.4 |

*¹The ratio (c'/a') is the ratio of the average length of the tip (c') to the average width (a').
*²(d'/a') is the ratio of the period (d') to the average width (a').
* The period (d') of the one-dimensional grid pattern of the metal reflector is 140 nm.

INDUSTRIAL APPLICABILITY

Since the wire-grid polarizer of the present invention is excellent in polarization performance, can maintain required light transmittance and has low reflectance on the back side, it is expected to be applied not only to optical products such as various displays, cameras, and optical measuring instruments, but also to polarized sunglasses, smart windows, etc.

REFERENCE SIGNS LIST 1, 2: wire-grid polarizer (R1)
3: wire-grid polarizer (R2)
4: wire-grid polarizer (R3)
11: sheet (A)
12: front side of sheet (A)
13: back side of sheet (A)
14, 16, 18: metal reflector (B)
15, 17, 19: portion (D)
21: mold
22: convex part of mold
23: groove (C)
24: ink containing metal fine particles
25: sintered body of metal fine particles

What is claimed is:

1. A wire-grid polarizer comprising:
a transparent sheet; and
a plurality of metal reflectors entirely embedded in a plurality of grooves formed in a front surface of the transparent sheet in a one-dimensional grid array direction and with a constant period (d),
wherein each of the metal reflectors has a constant width portion and an end portion having a shape that gradually becomes thinner in a linear or smoothly curved cross-sectional shape toward a tip taken perpendicular to the front surface of the transparent sheet,
the constant width portion of each of the metal reflectors has an average width (a) of 200 nm or less,
the metal reflectors have an average thickness (b) along a direction from the front surface of the transparent sheet to the tip of the end portion in a backward direction thereof so that a ratio (b/a) of the average thickness (b) to the average width (a) is from 4 to 25, and
the end portions of the metal reflectors have an average length (c) toward the tip so that a ratio (c/a) of the average length (c) to the average width (a) is from 1.2 to 4.7, and a ratio (c/b) of the average length (c) to the average thickness (b) is from 0.127 to 0.315.

2. The wire-grid polarizer according to claim 1, wherein a ratio (d/a) of the constant period (d) of the metal reflectors to the average width (a) is from 2.0 to 20.

3. The wire-grid polarizer according to claim 1, wherein the shape of the end portion that gradually becomes thinner toward the tip in the thickness direction of the metal reflector is
an almost inverted triangular shape having an apex located in the tip direction in the cross-section perpendicular to the one-dimensional grid array direction (as referred to a wire-grid polarizer (R1)),
a continuous, almost triangular wave shape having apexes located in the tip direction in the cross-section perpendicular to the front surface of the transparent sheet and in the one-dimensional grid array direction (as referred to a wire-grid polarizer (R2)), or
a shape that almost quadrangular pyramid structures having an apex located in the tip direction or structures gradually changing into an almost conical shape toward the apex from the base of the almost quadrangular pyramid structure are continuous in the one-dimensional grid array direction (as referred to a wire-grid polarizer (R3)).

4. The wire-grid polarizer according to claim 3, wherein the shape of the end portion that gradually becomes thinner toward the tip in the thickness direction of the metal reflector is such that, in the case of the wire-grid polarizer (R1), the height toward the tip of the almost inverted triangular shape in the cross-section perpendicular to the front surface of the transparent sheet and in the one-dimensional grid array direction changes further continuously and regularly or irregularly, in the case of the wire-grid polarizer (R2), the length of the base and the height toward the tip having an almost triangular wave shape in the cross section perpendicular to the front surface of the transparent sheet and in the one-dimensional grid array direction change further continuously and regularly or irregularly, or in the case of the wire-grid polarizer (R3), the length in the one-dimensional grid array direction and the height toward the tip of the almost quadrangular pyramid structure or the structure gradually changing into an almost conical shape toward the apex from the base of the almost quadrangular pyramid structure change further continuously and regularly or irregularly.

5. The wire-grid polarizer according to claim 1, wherein each of the metal reflectors is embedded in the groove as a single continuous structure or in such a manner that a plurality of block-like structures are stacked in the groove at a high density independently or partially or fully bonded together on outer surfaces thereof.

6. The wire-grid polarizer according to claim 1, wherein the metal reflector is a sintered body of metal fine particles.

7. The wire-grid polarizer according to claim 1, wherein the transparent sheet is a sheet made from a material selected from polycarbonate resin, polyacrylic resin, polyamide resin, polyester resin, polyolefin resin, polycycloolefin resin, polyurethane resin, cellulose resin, polyvinyl chloride resin, polyether resin, polyacrylate resin and polysulfone resin.

8. The wire-grid polarizer according to claim 1, wherein the metal reflector is made from one or a mixture of two or more selected from aluminum, nickel, chromium, platinum, palladium, titanium, gold, silver, copper and alloys thereof.

9. A process for manufacturing the wire-grid polarizer according to claim 1, comprising:
   forming the wire-grid polarizer including the steps of:
   forming grooves in a front surface of a transparent sheet in a one-dimensional grid array direction with a constant period by a nanoimprinting method; and
   embedding metal reflectors entirely in the grooves,
   wherein the grooves have a constant width portion and an end portion that gradually becomes thinner in a linear or smoothly curved shape toward a tip thereof, and
   an average width (a') of the constant width portions is 200 nm or less,
   a ratio (b'/a') of an average length (b') of the grooves toward the tip of the end portion to the average width (a') is from 4 to 25, and
   a ratio (c'/a') of an average length (c') of the end portions toward the tip to the average width (a') is 1.2 or more.

* * * * *